Sept. 5, 1939.  J. T. RULE  2,171,894
APPARATUS FOR PRODUCING STEREOGRAPHIC DRAWINGS
Filed Nov. 17, 1937  5 Sheets-Sheet 5

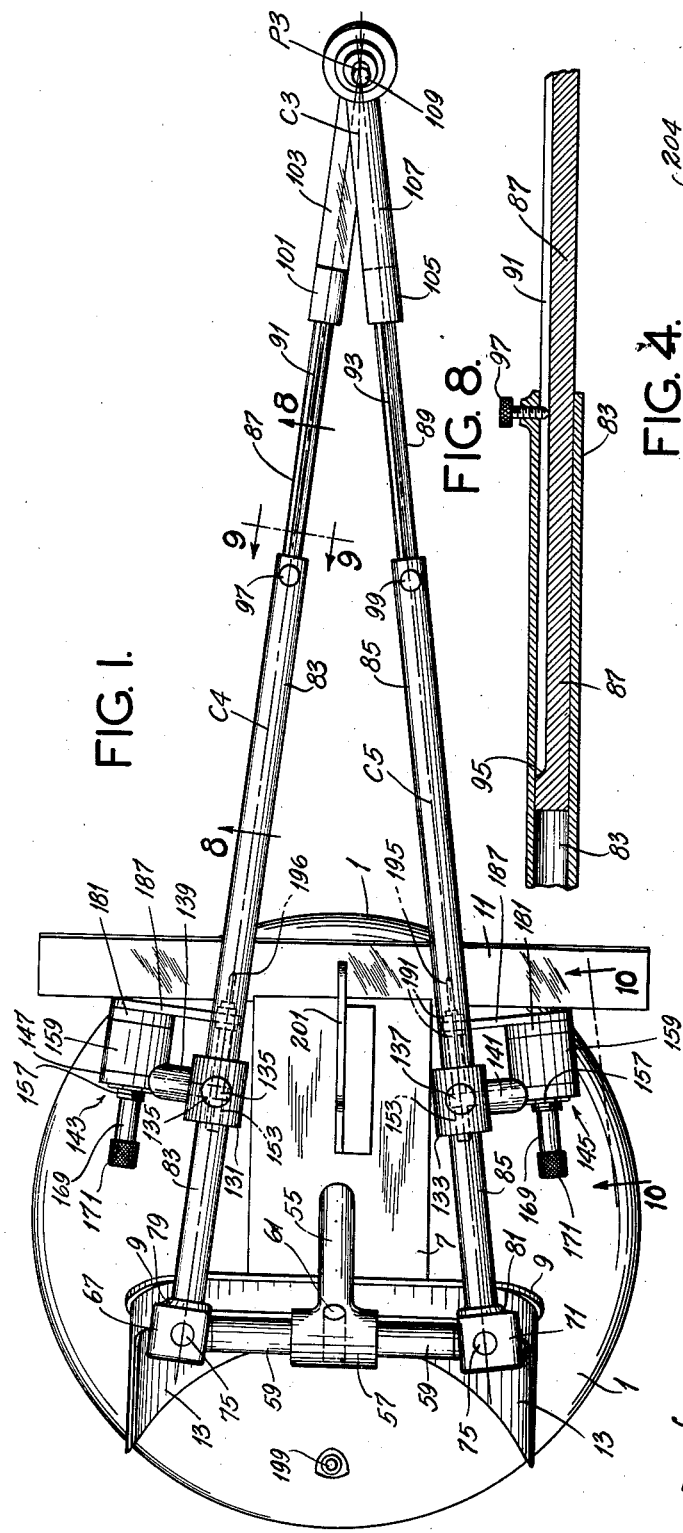

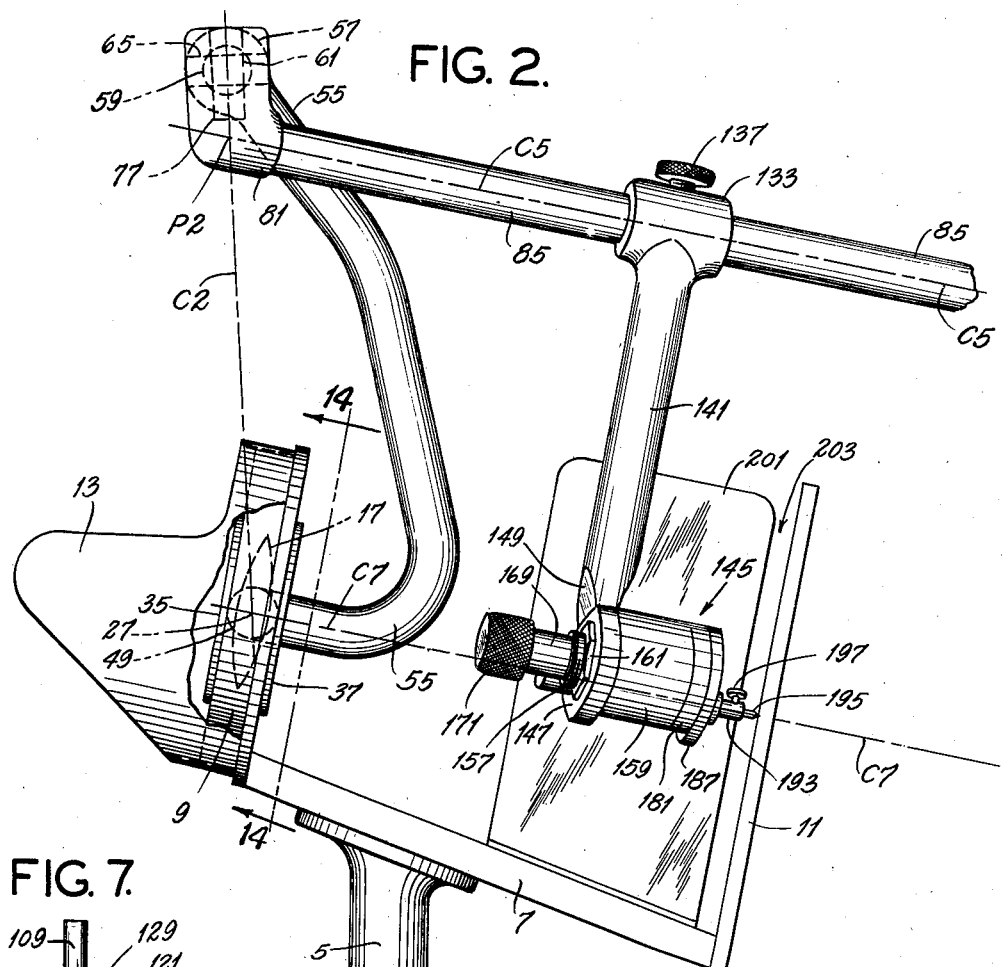

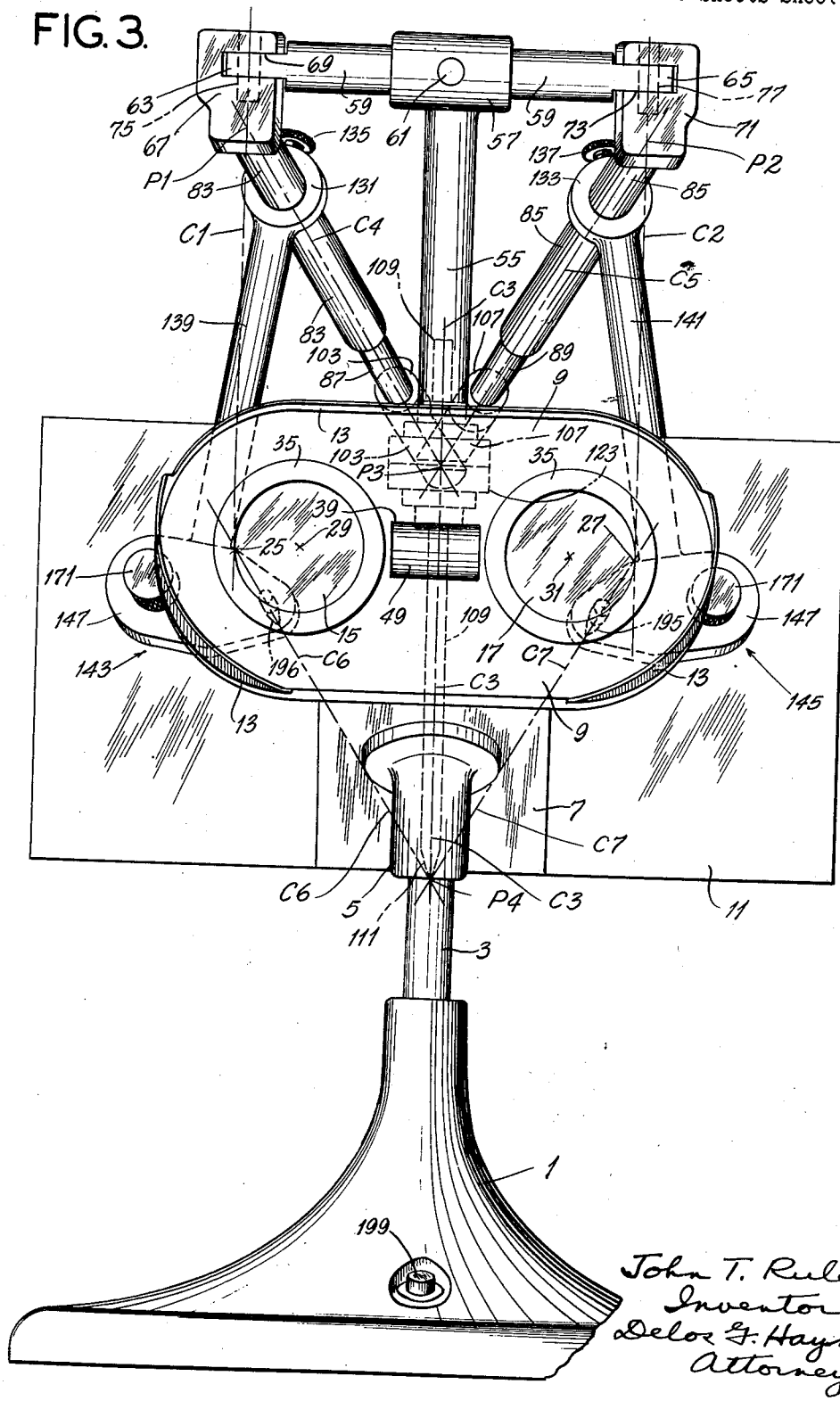

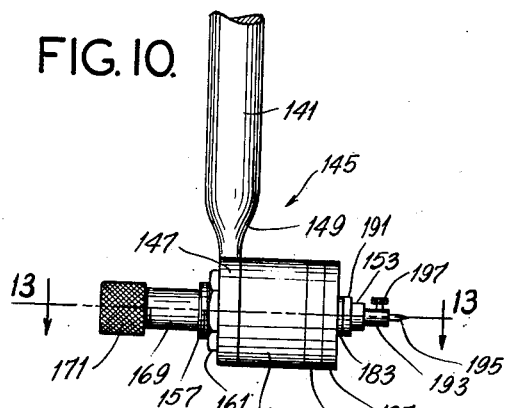
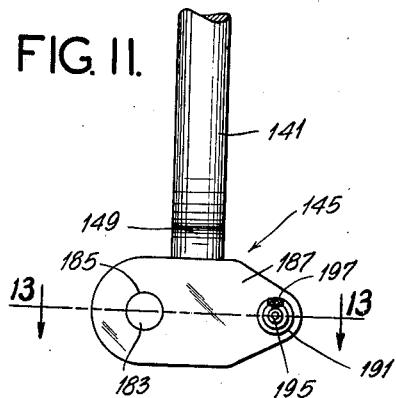
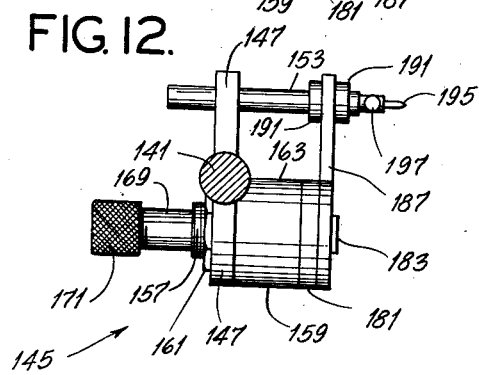
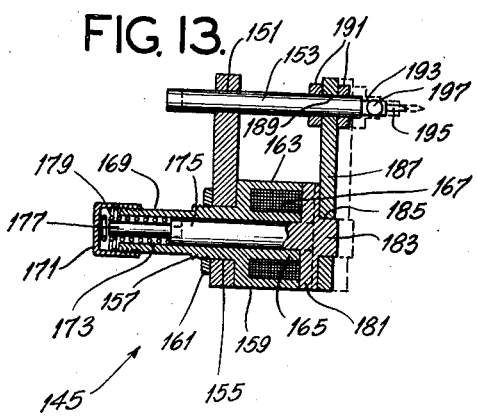
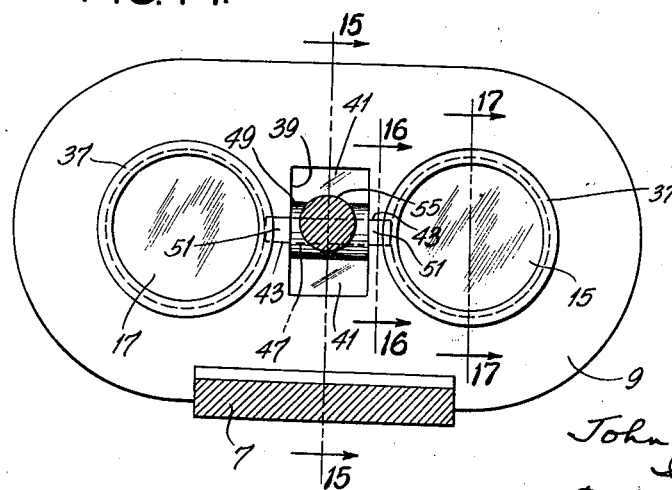

Patented Sept. 5, 1939

2,171,894

UNITED STATES PATENT OFFICE 2,171,894

APPARATUS FOR PRODUCING STEREOGRAPHIC DRAWINGS

John T. Rule, Truro, Mass.

Application November 17, 1937, Serial No. 175,049

25 Claims. (Cl. 33—20)

This invention relates to apparatus for drawing, and with regard to certain more specific features, to apparatus for producing stereographic drawings.

Among the several objects of the invention may be noted the provision of apparatus for producing a pair of drawings of an object, which drawings bear stereographic relation to each other, that is, when the drawings are simultaneously viewed in a proper viewing device, they apparently fuse or coalesce in such a manner as to present an illusion of depth, or a three-dimensional appearance, to the observer; the provision of apparatus of the class described, which is capable, in a single operation, of producing stereographically related drawings of relatively complicated objects with a minimum of difficulty; the provision of apparatus of the class described which is likewise adapted for the sketching of irregular objects, scenes, and the like, in order to produce stereographic sketches; the provision of apparatus of the class described which automatically and accurately, produces two perspective views of the object drawn, which perspective views are accurately related to each other in a manner corresponding to the relationships of binocular vision; and the provision of apparatus of the class described which is relatively simple in construction and operation. Other objects will be in part obvious and in part pointed out hereinafter.

The invention accordingly comprises the elements and combinations of elements, features of construction and arrangements of parts, which will be exemplified in the structures hereinafter described, and the scope of the application of which will be indicated in the following claims.

In the accompanying drawings, in which is illustrated one of various possible embodiments of the invention, Fig. 1 is a top plan view of one embodiment of stereographic drawing apparatus made in accordance with the present invention;

Fig. 2 is a side elevation of a part of the apparatus of Fig. 1;

Fig. 3 is a front elevation of the apparatus of Fig. 1;

Fig. 4 is a representation of a typical stereographic drawing as produced with the apparatus of the present invention;

Fig. 5 is a side elevation of a space pencil;

Fig. 6 is a top plan view of the space pencil of Fig. 5;

Fig. 7 is an axial section of the space pencil of Figures 5 and 6;

Fig. 8 is an enlarged cross section taken substantially along line 8—8 of Fig. 1;

Fig. 9 is an enlarged cross section taken substantially along line 9—9 of Fig. 1;

Fig. 10 is an enlarged side elevation of a recording stylus, taken substantially along line 10—10 of Fig. 1;

Fig. 11 is a front elevation of the recording stylus of Fig. 10;

Fig. 12 is a top plan view of the recording stylus of Figures 10 and 11;

Fig. 13 is a cross section taken substantially along lines 13—13 of Figures 10 and 11;

Fig. 14 is a back elevation of a lens board, taken substantially along line 14—14 of Fig. 2;

Figure 15:
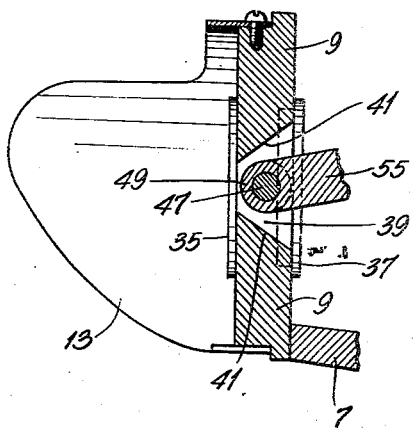
Figure 16:
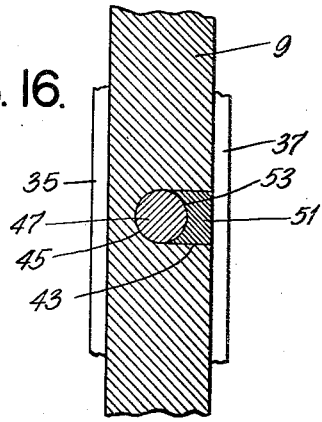
Figure 17:
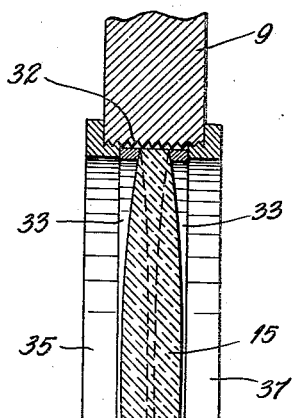
Figure 18:
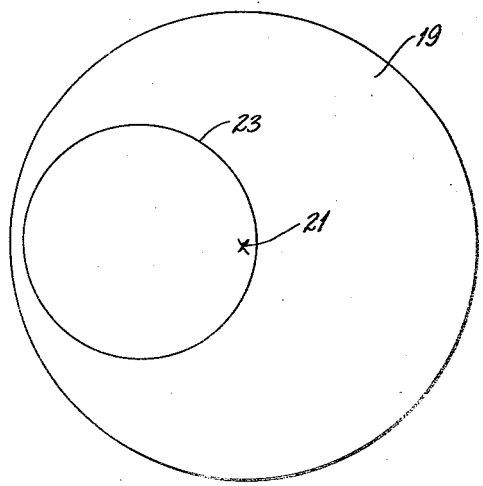
Figure 19:
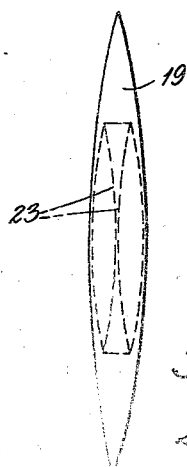

Figures 15, 16, and 17 are cross sections taken substantially along lines 15—15, 16—16, and 17—17, respectively, of Fig. 14; and, Figures 18 and 19 are diagrams illustrating a manner in which lenses used in the present invention are cut.

Similar reference characters indicate corresponding parts throughout the several views of the drawings.

While stereographic photographs have long been used, the production of stereographic drawings has not heretofore been attempted to any great extent, primarily because of the complexity attendant thereupon.

A stereograph, it will be understood, is a sheet, card, or the like, on which are displayed, in proper relationship to each other, a pair of perspective views or pictures of an object, scene, or the like. The two views are arranged in side-by-side relationship, the left-hand picture being the perspective of the object as it appears to the left eye of the observer, and the right-hand picture being a perspective view of the object as it appears to the right eye of the observer. When such a stereograph is placed in a proper viewing device, the two pictures are made visible mutually exclusively to the two eyes of the observer for which they are designed; that is to say, the left-hand picture is visible only to the left eye, while the right-hand picture is visible only to the right eye. In a proper viewing device, this means that the two pictures will fuse or coalesce, and the observer will accordingly experience an illusion that he is viewing a three-dimensional object in space.

The term "object" as used herein, is meant to be inclusive of all subjects that it may be desired to represent, and includes scenes, landscapes, mechanical drawings, and all other types of subjects which may be graphically presented.

The production of stereographic photographs has been a comparatively simple matter, because the separate perspective views have readily been made by the photographic method of taking two separate pictures at the same time, the viewpoints of the two pictures being separated by an amount equal to the interocular distance.

However easy stereographic photographs have been to make, stereographic drawings, it will be seen, are fundamentally a considerably different proposition, because not only are individual perspective drawings themselves rather difficult to produce, with any degree of accuracy, but the production of two such perspective drawings with such a small difference in viewpoints between the two drawings, and having the high degree of accuracy necessary to make the images properly fuse or coalesce when viewed stereographically, is so difficult as to be practically impossible. By careful calculations, and expert draftsmanship, it has been possible, by drawing-board methods, to produce a few relatively simple stereographic drawings of a mechanical or geometrical character. However, to my knowledge, no one has ever heretofore attempted to produce stereographically related drawings of the character of sketches, such as artistic portraits, because the difficulties of making two slightly differing perspective views of so irregular a subject as a portrait are practically insurmountable.

The apparatus of the present invention, it is believed, is the first apparatus that has ever been devised whereby stereographic drawings may be produced automatically, in the sense that both of the pictures of the stereograph are simultaneously produced, each view being itself accurate from its proper perspective viewpoint, and both views being properly scaled and located with respect to each other so that they fuse properly in a viewing instrument.

Referring now more particularly to Figures 1 and 3, numeral 1 indicates a relatively heavy base upon which the apparatus of the present invention is mounted. Extending upwardly from the base 1 is a vertical standard 3 (see also Fig. 2). At the top of the standard 3 is mounted a flange fitting 5, the flange of which is preferably oblique with respect to the horizontal, as shown in Figures 2 and 3. The flange fitting 5 supports a rectangular platform 7 which, it will be seen, is likewise at an oblique angle with respect to the horizontal.

The front, or left-hand (Fig. 2) end of the platform 7 mounts an upstanding lens board 9, while the rear, or right-hand (Fig. 2) end of the platform 7 mounts a drawing board or table 11. The drawing board 11 and the lens board 9 are parallel to each other, but are preferably somewhat off true vertical, as shown in Fig. 2.

The lens board 9, referring to Figures 1 and 3, is preferably an elongated body with rounded ends. It is preferably recessed around its periphery to receive, with a spring fit, an eye shade 13, although this element may be dispensed with if desired. The lens board 9 serves to support, at equi-distance points from the center thereof, left-eye and right-eye lenses 15 and 17, respectively. The lenses 15 and 17, which may be of any suitable type, are preferably, for dimensional reasons, of a type illustrated, for example, in Figures 18 and 19. In Figures 18 and 19 numeral 19 indicates a simple bi-convex meniscus lens, having a geometrical (and optical) center 21. From this ordinary lens 19 there is cut a circular lens of smaller diameter, which may be either the lens 15 or 17. Line 23 in Figures 18 and 19 indicates the edge of the lens so cut. It will be seen that the cutting is performed so that the optical center of the new lens, which remains the same as the optical center of the complete lens 19, is relatively near the periphery of the new lens. Each of the lenses 15 and 17 is preferably of this type, namely, a circular portion of a bi-convex meniscus lens having its optical center near its periphery. In mounting the lenses 15 and 17 in the lens board 9, the respective optical centers thereof, indicated by numerals 25 and 27, are positioned on a horizontal line and away from each other, so that the two optical centers 25 and 27 are respectively as near the ends of the lens board 9 as possible. So arranged, the optical centers 25 and 27 may be, and usually are, separated by a distance approximately equal to 90 millimeters. This means that the geometrical centers of lenses 15 and 17, indicated respectively in Fig. 3 by numerals 29 and 31, are separated by a distance approximately equal to 63.5 millimeters, which is the normal human interocular distance.

The manner in which the lenses 15 and 17 are mounted in the lens board 9 is shown more particularly in Figures 14 and 17, to which attention is now directed. For each of the lenses 15 and 17, a circular hole 32, suitably provided with threads, is formed in the lens board 9. The lens 15 or 17, as the case may be, is slidably received in this threaded hole 32. A mounting ring 33 is then placed on each side of the lens. The mounting rings 33 have internal diameters, preferably, such that they leave the optical centers of the lenses 15 and 17 in the clear. The shapes of the edges of the rings 33 are such that they provide a firm pressure along the entire periphery of the lens, and at the same time present smooth uni-planar clamping faces away from the lens. The rings 33, and consequently the respective lenses, are held in position by means of front and back lens flanges 35 and 37, respectively, which thread into the holes 32. As in the case of the rings 33, the internal diameters of the flanges 35 and 37 are preferably such that said flanges do not mask the optical centers of the lenses 15 and 17.

Referring now more particularly to Figures 14 and 15, it will be seen that the portion of the lens board 9 between the lenses 15 and 17 is provided with a rectangular opening 39 therethrough. The opening 39 has sloping upper and lower walls 41, so that it is deeper, from top to bottom, at the back of the lens board 9 than it is at the front.

Connecting the lens openings 31 in the lens board 9, and on a line connecting the optical centers of lenses 15 and 17, and extending across the opening 39, is a groove 43 (see also Fig. 16) which is open at the back face of the lens board 9, and which is bottomed by a semi-circular portion 45 (see Fig. 16). The groove 43 serves as a partial bearing for a cylindrical pin 47, on which is pivoted a bushing 49. The pin 47 is held in position at the bottom of groove 43 by means of a pair of blocks 51, one located in the groove 43 on each side of the opening 39, which blocks 51 have semi-circular grooves 53 in the bottom faces thereof. The grooves 53, together with the semi-circular bottoms 45 of the grooves 43, complete true cylindrical bearings for the pin 47. The blocks 51 are in turn held in position by the overlying rear lens flanges 37, which also hold the respective lenses 15 and 17 in position. This arrangement permits the ready replacement of blocks 51 if wear takes place thereon, as it is important that there be no considerable amount of play in the pivoting of bushing 49 with respect to the lens board 9.

The bushing 49, lengthwise, fits snugly into the opening 39, so that no endwise play of said bushing on the pin 47 is permitted.

Extending forwardly from the bushing 49, and preferably formed integrally therewith, is a bracket member 55 (see also Figures 1, 2 and 3). The bracket 55, which is generally of C shape, pivots at one end on the pin 47, its movement being in a plane that is preferably perpendicular to the plane of the lens board 9. At its upper end, the bracket 55 carries a bushing 57, which is preferably formed integrally therewith. The axis of the bushing 57 is parallel to the axis of the pin 47.

Extending through the bushing 57 is a bracket or shaft 59. A pin 61 that passes through both bushing 57 and bracket 59 prevents rotation of the bracket 59 in the bushing 57.

The opposite ends of the bracket 59 are both cut away to provide flat regions 63 and 65, respectively.

Numeral 67 indicates a pivot block, which is provided, near its upper end, with an inwardly extending slot 69 that closely receives the flat portion 63 of bracket 59. A similar block 71, with a slot 73, receives the flat portion 65 at the other end of bracket 59. Pins 75 and 77, respectively, provide pivots whereby the blocks 67 and 71 swing on the flat portions 63 and 65 of shaft 59. The axes of the pins 75 and 77 are located on straight lines, indicated by index characters C1 and C2, respectively, which intersect the optical centers 25 and 27 of the lenses 15 and 17. The flat faces of the flat regions 63 and 65 of shaft 59, and the cooperating faces of the flat regions 63 and 65 of shaft 59, and the cooperating faces of the blocks 67 and 71, are all perpendicular to respective lines C1 and C2.

The lines C1 and C2, in addition to intersecting the optical centers 25 and 27 of lenses 15 and 17, respectively, are parallel to each other, and are contained in a plane which likewise includes an imaginary line connecting said optical centers 25 and 27, and, in said imaginary plane, are perpendicular to said imaginary line.

Extending forwardly from the lower rear faces of the blocks 67 and 71 are sockets 79 and 81, respectively. The sockets 79 and 81 receive, and non-rotatably mount, a pair of rearwardly extending tubes 83 and 85, respectively, which are preferably of the same length. Telescoping within the tubes 83 and 85 are extension rods 87 and 89, respectively. Slots or keyways 91 and 93, respectively, are provided along the length of the rods 87 and 89 (see also Fig. 8). The slots 91 and 93 preferably end somewhat short of the inner end of the rods 87 and 89, as indicated, for example, at numeral 95 in Fig. 8. At their outer ends, the tubes 83 and 85 are provided with set screws 97 and 99, the inner ends of which screws fit into the slots 91 and 93, respectively. The set screws 97 and 99, cooperating with the slots 91 and 93, therefore serve to prevent relative rotation of the rods 87 and 89 in the tubes 83 and 85, respectively, and likewise prevent the rods from sliding completely out of the tubes, by engagement of the set screws 97 with the ends 95 of the respective slots.

The outer end of rod 87 is non-rotatably and non-slidably received in the cylindrical bushing end 101 of an extension piece 103 (see also Figures 5, 6 and 7). The outer end of the rod 89 is similarly received, non-rotatably and non-slidably, in the cylindrical bushing end 105 of an extension piece 107. For a majority of its length, the extension piece 103 is of semi-circular cross section, with its flat face uppermost. For a majority of its length, the extension piece 107 is of semi-circular cross section, but with its flat face lowermost. This means that, under conditions to be described, the extension pieces 103 and 107 may slide or move one over the other, as indicated, for example, in Figures 1, 5 and 6.

Numeral 109 (Figures 1, 3, 5, 6, and 7) indicates a cylindrical rod, the lower end 111 of which is pointed. This rod 109 will hereinafter be referred to as a space pencil. Numeral 113 indicates a collar that is shrunk or otherwise tightly affixed to the pencil 109. Resting on the collar 113 is a bushing 115, having a lower peripheral flange 117, a cylindrical outer surface 119 and a threaded upper end 121. Rotatably received on the cylindrical outer surface 119 of the bushing 117 are a pair of circular rings 123 and 125, respectively. The ring 123 is securely affixed, as by welding, to the outer end of extension piece 103, while the ring 125 is similarly securely affixed to the outer end of the extension piece 107. The connection is such that the extension pieces 103 and 107 occupy radial positions with respect to the space pencil 109. A collar 127 is threaded onto the threaded end 121 of bushing 115 in order to hold the rings 123 and 125 against axial movement, and a collar 129, shrunk or otherwise tightly fitted on the space pencil 109, holds the bushing 115 against axial movement with respect to the space pencil 109.

The various parts just described are so constructed and arranged that the axis of the space pencil 109, indicated by index character C3 in Figures 1 and 5, is parallel to the previously-mentioned lines C1 and C2, which are the projected axes of pins 75 and 77 about which bearing blocks 67 and 71 rotate.

Referring now again to Figures 1, 2, and 3, it will be seen that the center line or axis of the telescoping assembly comprising the tube 83, rod 87, and extension piece 103, is indicated by reference character C4. Similarly, the axis of the telescoping assembly comprising the tube 85, rod 89, and extension 107, is indicated by reference character C5. From the nature of the bearings afforded by blocks 67 and 71, respectively, it will be seen that the line C4 intersects the previously-mentioned line C1 at a point designated as P1, while the line C2 intersects line C5 at a point designated as P2. By reason of the variously described bearing elements for the space pencil 109, it will likewise be seen that the lines C4 and C5 intersect each other, and the line C3, at a common point designated as P3 (see Fig. 5).

Referring again to Figures 2 and 3, index characters C6 and C7 indicate imaginary lines that extend outwardly from the optical centers 25 and 27 of the lenses 15 and 17, respectively. Line C6 is in a plane determined by lines C1 and C4, and is parallel to line C4. Line C7 is similarly in a plane determined by lines C2 and C5, and is parallel to line C5. Lines C6 and C7 intersect at a point designated as P4 (see also Fig. 5), which is located on line C3 and which constitutes the extreme or operative point of the space pencil 109.

It will now be seen that the lines C1, C4, C3, and C6 determine a parallelogram, while the lines C2, C5, C3, and C7 likewise determine a similar parallelogram. The two parallelograms have a common edge represented by the line C3, and common corners on said edge represented by points P3 and P4. The corners of the two parallelograms diagonally opposite the common corner represented by point P3 are the optical centers 25 and 27 of the lenses 15 and 17, respectively, and the two parallelograms thus pivot about these optical centers.

From the description heretofore given, it will be seen that the space pencil 109 is capable of universal movement in space. Its up-and-down movement is provided for by rotation of the bushing 49 on the pin 47. Its in-and-out movement is provided for by the telescoping of the rods 87 and 89 in the tubes 83 and 85, respectively, and, insofar as this requires pivoting movement of the tubes 83 with respect to the bracket 59, by pivoting of the bearing blocks 57 and 71 on the pins 75 and 77. Sidewise movement of the space pencil 109, in either direction, is provided by a combined pivoting of the tubes 83 and 85, through bearings 67 and 71, on pins 75 and 77, respectively, and by whatever telescopic movement of the rods 87 and 89 in the tubes 83 and 85 is required. Any and all of these directional movements of the space pencil 109 can take place simultaneously, by coaction of the various pivoting and telescopic means. All such movements represent pivoting or turning of the two parallelograms heretofore mentioned about the respective optical centers of lenses 15 and 17, and extension and contraction of the lengths of said parallelograms.

It will also be seen that, regardless of the position of the space pencil 109 in space, the lines C6 and C7 extend from their respective optical centers 25 and 27 to the operative point P4 of said space pencil 109.

Referring again to Figures 1, 2 and 3, numerals 131 and 133 indicate bushings that slide on the tubes 83 and 85, respectively. Set screws 135 and 137 are provided to lock the bushings 131 and 133 in whatever position they are set. Extending from the bushings 131 and 133 are arms or brackets 139 and 141, respectively. The arms 139 and 141, at their lower ends, carry record-making devices or assemblies indicated generally by numerals 143 and 145, respectively. The nature of these devices 143 and 145 is indicated in greater detail in Figures 10, 11, 12 and 13, to which attention is now directed.

Numeral 147 indicates a mounting plate which is secured, as by welding, to the lower end of arm 141 (or 139, as the case may be). The lower end of the arm 141 (or 139) is preferably tapered, as indicated at numeral 149, in order to make this connection. At one end, the plate 147 is provided with a hole 151 through which slidably passes the cylindrical stem 153 of a recording stylus to be described. At its other end, the plate 147 is provided with a hole 155 through which passes a hollow, externally threaded extension 157 from a cylindrical solenoid casing 159. A nut 161 holds the casing 159 firmly to the plate 147.

The solenoid casing 159, which is of cup-shape and open at its end away from the plate 147, has an external cylindrical portion 163 and an internal, hollow core-like portion 165. Between these two portions is an annular chamber, in which is fitted a solenoid winding or coil 167.

Extending rearwardly from the cylindrical extension 157 is a further cylindrical extension 169, of lesser diameter, and this is terminated by a threaded region receiving an externally knurled cap 171.

The solenoid casing 159 is made of a magnetic material of high permeability and low retentivity, such as steel.

Centrally through the body of the solenoid casing 159, as hereinbefore intimated, runs a cylindrical passage 173. In the passage 173 freely slides a pin or shaft 175, which is provided at its left-hand (Fig. 13) end with a portion 177 of reduced diameter. On the shoulder provided by the portion 175 rests one end of a compression spring 179, the other end of which bears against the inner top of cap 171. The spring 179 is arranged so that it provides a force, at all times, tending to push the shaft 175 to the right out of the solenoid casing.

At its right-hand end, the pin 175 joins a circular armature or pole piece 181, which is of magnetic material. The pole piece 181 may, if desired, be formed integrally with the stem 175. Projecting from the front face of the pole piece 181 is a boss 183, which passes through an opening 185 in a plate 187 that is similar in shape and positioning to the mounting plate 147. The boss 183 is upset or otherwise deformed in the hole 185 so that it firmly binds said plate 187 to the pole piece 181.

On its opposite side, the plate 187 is provided with a hole 189 through which passes the aforesaid stylus stem 153. Nuts or collars 191 secure the stem 153 against axial movement in the hole 189, and likewise against rotational movement. At its forward end, the stem 153 carries a suitable clamping device 193 which holds a sharpened piece of lead 195, or an ink stylus, or some other suitable record-making device. A thumb screw 197 is provided for purposes of adjustment.

So long as no current flows in the solenoid winding 167, the compression spring 179 forces the stem 175 to the right (Fig. 13) to its dotted line position, thus placing the recording means 195 in record-making position. However, when current flows in the winding 167, the pole piece 181 is drawn backwardly against the solenoid casing 159, to the full line position shown in Fig. 13, thus carrying the recording means 195 into retracted position. The stem 153, sliding in the hole 151 in plate 147, steadies the movement of the recording means. For purposes of brevity, the recording means per se 195 will hereinafter be referred to as the record-making or recording stylus. It will be understood that this may be of a pencil-like or ink-like character.

Returning again to Figures 1, 2 and 3, it will be seen that the recording devices 143 and 145 for the two arms 139 and 141 are similar, but oppositely facing. For this reason, it is not necessary to give separate index numbers to the various parts of the separate recording devices. However, in order to simplify certain explanations to be given hereinafter, the recording stylus 195 of the recording means 145 is indicated by the index character 195, while the similar recording stylus in the recording means 143 is indicated by the index character 196.

In assembly, the positions of the bushings 131 and 133 on the tubes 83 and 85 is so adjusted that the recording styli 195 and 196 press lightly, in the absence of electrical current in their respective solenoids, upon the surface of drawing board 11, and, what is perhaps more important, the mark-making points of said recording styli 195 and 196 are coincident with the points of intersection of the lines C7 and C6, respectively, with the drawing surface of drawing table 11. This arrangement is indicated in Fig. 3. This means that the recording styli 195 and 196 represent the imaginary points of intersection of the lines C7 and C6, respectively, with the drawing surface of the drawing table 11. This is an important factor, as will appear more fully hereinafter.

The pressure with which the recording styli 195 and 196 engage the surface of drawing board 11 may be adjusted by manipulating the knurled caps 171 on the extensions 169 of the recording devices 143 and 145.

The compression springs 179 of the recording devices 143 and 145 serve to keep said styli in contact with the surface of drawing boards 11, even through the slight in-and-out movement made necessary by the rotation of the imaginary lines C6 and C7 around the optical centers of the lenses 15 and 17.

The solenoid windings 167 of the two recording devices 143 and 145 are preferably connected in series with each other, and in series with a source of E. M. F., and with some sort of a circuit-controlling switch. For example, a push-button switch indicated generally by numeral 199 in Figures 1 and 3, may be provided at a convenient location in the base 1. Or, the switch 199 may be mounted on or associated with the space pencil 109, for example. When the switch 199 is manipulated so as to make connections in the electrical circuit, the two solenoids are energized, with the result that the recording styli 195 and 196 are magnetically lifted away from engagement with the drawing surface of drawing board 11, against the springs 179. This arrangement is of great convenience in operating the machine to make drawings, as it can readily be used to lift the styli from the drawing board at the ends of lines, etc.

The wires for connecting the various solenoid windings, switch, and source of E. M. F., are not shown in the drawings in the interest of clarity. For convenience, they may be strung through the various supports, brackets, etc., in hollows provided therefor.

Numeral 201 (Figures 1 and 2) indicates a plate or septum that is mounted in an upright position on the rectangular plate 7, at a mid-position thereon. Such a septum 201 is customary in stereographic viewing devices, and serves the purpose of masking the left eye view from the right eye lens and the right eye view from the left eye lens, respectively, when the device is used to make and view drawings stereographically. In order to provide space for mounting paper or the like on the drawing board 11 in making drawings, the septum 201 is preferably spaced a short distance away from the drawing board 11, a gap or interval 203 (see Fig. 2) being thus left for the insertion of paper.

The apparatus as thus described is operated, in order to make a stereographic drawing of an object, for example, in the following manner:

A sheet of paper or like material is first affixed to the forward or drawing surface of the drawing board 11. Normally, a sheet of paper of such size is used so that it covers substantially the whole drawing board. It may be affixed thereto with suitable spring clips, adhesive tape, thumb tacks or any other suitable means.

Care is then taken that the styli 195 and 196 are in suitable condition to make records; for example, if they are pencil styli, the lead is suitably sharpened, or if they are ink styli, a suitable supply of ink is provided in each of them.

The operator positions himself at the device with his right and left eyes, respectively, in position before the lenses 17 and 15, and looks through said lenses at the drawing board 11. Because of their angular relationship to each other the points of styli 195 and 196 appear to fuse, or coalesce, and the observer thus gains the illusion of looking at one stylus rather than two separate styli.

The operator then grasps the space pencil 109. Ordinarily this may be done by passing an arm around the standard 3. The space pencil 109 is then manipulated in space, moving in all three dimensions, as if sculpting the object which it is desired to represent. To the observer, the fused image of styli 195 and 196 appears to move in space corresponding to, or proportionally to, the space movement of the space pencil 109. As the space pencil 109 is moved, the styli 195 and 196 make recordings on the drawing paper, in the form of lines, dots, or whatever other form is desired. Ends of lines, and non-recording movements of the space pencil 109, are provided for by manipulation of the switch 199. Since the lines that are made by styli 195 and 196 are at all times, simultaneously, in stereographic relation to each other, the lines appear to the observer to be drawn in space, hence the observer has the illusion that he is actually drawing a picture in three dimensions, or in space.

Fig. 4 shows, by way of example, a stereographic drawing such as may be made with the apparatus described. It will be seen that Fig. 4 presents a card or sheet of paper 204, on which occur a right eye picture 205 and a left eye picture 207. The particular pictures shown in Fig. 4 are those of polyhedrons, and illustrative of the proposition of classical solid geometry, that "an oblique prism is equivalent to a right prism whose base is a right section of the oblique prism, and whose altitude is equal to a lateral edge of the oblique prism."

The reason why the drawings produced by the two styli 195 and 196 are in proper relationship to each other for stereographic viewing can now be made clear. As hereinbefore indicated, a proper stereographic arrangement comprises one wherein two perspective views are presented, the two views being taken at viewpoints virtually separated by the interocular distance. A perspective drawing, as is well known, is a conical projection or trace on an intersecting plane of the object, the apex of the cone being located at the viewing point. The apparatus as provided automatically draws two perspective views of the object being drawn, because the styli 195 and 196 are always located on the sight lines or rays C7 and C6 running from the respective optical centers 27 and 25 of the lenses 17 and 15, to the particular point of the object being drawn, represented by the point P4 of space pencil 109. Furthermore, the two drawings made by the styli 195 and 196 will be proper perspective drawings, since they are true conical projections, the lines of vision, being virtually the two lines C7 and C6, remaining straight as the space pencil 109 is moved in the course of the drawing.

In general, for proper stereographic viewing of the drawings prepared by the present apparatus, the perpendicular distance between the optical centers of lenses 15 and 17 and the drawing surface of the drawing board 11 should be determined by the particular device that is to be used for viewing the resultant stereographic pictures. For undistorted stereographic viewing, this distance should be equal to the focal length of the lenses of the viewing apparatus, which are the same, preferably, as the lenses 15 and 17.

In order to get the proper separation between pictures in the resultant stereograph for viewing in other stereoscopic viewing devices, for example, it is sometimes necessary to cut apart the paper as it comes from the drawing board 11 after a drawing has been made, and to remount the two sections of the drawing at a separation distance greater or less than the distance at which they were produced.

For accurate stereographic drawings, such as stereographic mechanical drawings (Fig. 4 is exemplary of such a drawing), it is advisable that a universally mounted drawing board or like object be provided in the space in which the space pencil 109 operates. By setting such a drawing board at a given spatial angle, and then manipulating the space pencil 109 on said drawing board with the aid of the usual straight edge and like instruments, the accuracy of the resultant stereographic drawing can be enhanced. The universally mounted drawing board can then readily be shifted to another spatial angle for representing another plane of the object being drawn.

For artistic or other stereographic sketching, however, it is in general not necessary to use the universally mounted drawing board referred to.

It will be understood, of course, that the drawing may be made by fixing an object (such as the prism shown in Fig. 4) in space, and then merely manipulating the point P4 of the space pencil 109 so as to follow or trace the edges of said object. This procedure constitutes an excellent method of training a draftsman in the technique of the use of the stereographic drawing apparatus of the present invention.

For maximum ease of manipulation, the apparatus should be constructed as of light materials as is mechanically feasible, and all pivots, sliding joints, and the like, should be made easy working, albeit accurate.

In order to adapt the drawing apparatus for the making of drawings for various stereographic viewing devices, or for hyperstereoscopic effects, the distance between the drawing board 27 and the lenses 15 and 17 may be made adjustable, for example, by mounting the drawing board 11 on a slidable track on base plate 7, and also that the distance between the optical centers 25 and 27 of the lenses 15 and 17 be adjustable, as by providing suitable sliding lens mounts in the lens board 9.

Reduced to the simplest terms, the apparatus of the present invention comprises means for finding mechanically the moving traces on a fixed picture plane of two rays from a moving point on one side of the plane, to two stationary points on the other side of the plane. Referring to the embodiment of the invention already described, the lines C6 and C7 are the two rays above referred to, the point P4 of the space pencil 109 is the moving point, and the optical centers 25 and 27 of the lenses 15 and 17 are the two stationary points referred to, the styli 196 and 195 recording graphically, the moving traces of the lines C6 and C7.

Within this broad concept of the invention, numerous other forms of apparatus are possible.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

I claim:

1. Stereographic drawing apparatus comprising means providing a fixed picture plane, means providing a point movable in space on one side of the picture plane, and means providing two points relatively fixed in position with respect to the picture plane, on the other side of the picture plane, and means recording, on the picture plane, the traces of the points of intersection of straight lines connecting the two fixed points and the single moving point.

2. Stereographic drawing apparatus comprising means providing a fixed picture plane, means providing a point movable in space, and means providing two points relatively fixed in position with respect to the picture plane, and means recording the traces on the picture plane of the points of intersection therewith of straight lines connecting the two fixed points and the single moving point.

3. Stereographic drawing apparatus comprising means providing a fixed picture plane, means providing a point movable in space, and means providing two points relatively fixed in position with respect to the picture plane, means recording the traces on the picture plane of the points of intersection therewith of straight lines connecting the two fixed points and the single moving point, and means for stereographically viewing the traces as they are produced.

4. Stereographic drawing apparatus comprising means providing a fixed picture plane, means providing a point movable in space on one side of the picture plane, and means providing two points relatively fixed in position with respect to the picture plane, on the other side of the picture plane, and means recording, on the picture plane, the traces on the plane of the points of intersection therewith of straight lines connecting the two fixed points and the single moving point, said means providing the picture plane comprising the surface of a drawing table.

5. Stereographic drawing apparatus comprising means providing a pair of pivot points, means joining each of said pivot points to a common means providing a movable point, a drawing table, and a pair of recording means movable on said table to produce drawings thereon, one of said recording means being attached to each of said joining means for coextensive movement therewith.

6. Stereographic drawing apparatus comprising means providing a pair of pivot points, means joining each of said pivot points to a common means providing a movable point, a drawing table, and a pair of recording means movable on said table to produce drawings thereon, one of said recording means being attached to each of said joining means for coextensive movement therewith, said recording means intersecting said drawing table on straight lines which join the pivot points and the movable point.

7. Stereographic drawing apparatus comprising means providing a pair of pivot points, means joining each of said pivot points to a common means providing a movable point, a drawing table, and a pair of recording means movable on said table to produce drawings thereon, one of said recording means being attached to each of said joining means for coextensive movement therewith, said recording means intersecting said drawing table on straight lines which join the pivot points and the movable point, and means for stereographically viewing the drawings on said drawing table as they are produced by said recording means.

8. Stereographic drawing apparatus comprising means providing a pair of pivot points, means joining each of said pivot points to a common means providing a movable point, a drawing table, and a pair of recording means movable on said table to produce drawings thereon, one of said recording means being attached to each of said joining means for coextensive movement therewith, said recording means intersecting said drawing table on straight lines which join the pivot points and the movable point, said pivot points being located on one side of said drawing table, while said movable point is located on the other side of said drawing table.

9. Stereographic drawing apparatus comprising means providing a pair of pivot points, means joining each of said pivot points to a common means providing a movable point, a drawing table, and a pair of recording means movable on said table to produce drawings thereon, one of said recording means being attached to each of said joining means for coextensive movement therewith, said recording means intersecting said drawing table on straight lines which join the pivot points and the movable point, said pivot points being located on one side of said drawing table, while said movable point is located on the other side of said drawing table, and a pair of lenses positioned for viewing said drawing table, the optical centers of said lenses being located one at each of said pivot points.

10. Stereographic drawing apparatus comprising means providing a pair of pivot points, means joining each of said pivot points to a common means providing a movable point, a drawing table, and a pair of recording means movable on said table to produce drawings thereon, one of said recording means being attached to each of said joining means for coextensive movement therewith, said joining means being telescopic, whereby said movable point may be moved to and away from said pivot points.

11. Stereographic drawing apparatus comprising a drawing table, two recording means adapted to produce separate drawings on said table, means providing a pair of pivot points relatively fixed in location with respect to said drawing table, a movable space pencil, and separate means extending from each of said pivot points to said space pencil, one of said recording means being attached to and having its motion controlled by each of said last-named means.

12. Stereographic drawing apparatus comprising a drawing table, two recording means adapted to produce separate drawings on said table, means providing a pair of pivot points relatively fixed in location with respect to said drawing table, a movable space pencil, and separate means extending from each of said pivot points to said space pencil, one of said recording means being attached to and having its motion controlled by each of said last-named means, said extending means being constructed and arranged for universal movement of said space pencil.

13. Stereographic drawing apparatus comprising a drawing table, two recording means adapted to produce separate drawings on said table, means providing a pair of pivot points relatively fixed in location with respect to said drawing table, a movable space pencil, and separate means extending from each of said pivot points to said space pencil, one of said recording means being attached to and having its motion controlled by each of said last-named means, said extending means being constructed and arranged for universal movement of said space pencil, the points of engagement of said recording means and said drawing table being respectively located on straight lines joining said pivot points and said space pencil.

14. Stereographic drawing apparatus comprising a drawing table, two recording means adapted to produce separate drawings on said table, means providing a pair of pivot points relatively fixed in location with respect to said drawing table, a movable space pencil, and separate means extending from each of said pivot points to said space pencil, one of said recording means being attached to and having its motion controlled by each of said last-named means, said extending means being constructed and arranged for universal movement of said space pencil, the points of engagement of said recording means and said drawing table being respectively located on straight lines joining said pivot points and said space pencil, and means for stereographically viewing the drawings as they are made.

15. Stereographic drawing apparatus as set forth in claim 2, including means for rendering the recording means temporarily inoperative.

16. Stereographic drawing apparatus as set forth in claim 4, including means for rendering the recording means temporarily inoperative.

17. Stereographic drawing apparatus as set forth in claim 5, including means for rendering the recording means temporarily inoperative.

18. Stereographic drawing apparatus comprising a lens board, a pair of viewing lenses mounted therein, a bracket pivoted at one end on the lens board and swinging in a plane perpendicular to the plane of the lens board, a second bracket immovably fixed at the end of the first bracket and extending therefrom in two directions, said second bracket carrying pivoting means at each end thereof, the axes of said pivoting means, extended, intersecting the optical centers of the respective two lenses, telescopic arms pivoted together at one end and having their respective other ends supported by said pivoting means, a space pencil carried by said arms at the end at which they are pivoted together, a drawing table supported between said lens board and said space pencil, and stationary relative to said lens board, and a pair of recording styli supported one on each of said telescopic arms and engaging the surface of the drawing table to make records thereon.

19. Stereographic drawing apparatus comprising a lens board, a pair of viewing lenses mounted therein, a bracket pivoted at one end on the lens board and swinging in a plane perpendicular to the plane of the lens board, a second bracket immovably fixed at the end of the first bracket and extending therefrom in two directions, said second bracket carrying pivoting means at each end thereof, the axes of said pivoting means, extended, intersecting the optical centers of the respective two lenses, telescopic arms pivoted together at one end and having their respective other ends supported by said pivoting means, a space pencil carried by said arms at the end at which they are pivoted together, a drawing table supported between said lens board and said space pencil, and stationary relative to said lens board, and a pair of recording styli supported one on each of said telescopic arms and engaging the surface of the drawing table to make records thereon, the recording points of said styli being located on straight lines joining the point of the space pencil to the respective optical centers of said lenses.

20. Stereographic drawing apparatus comprising a lens board, a pair of viewing lenses mounted therein, a bracket pivoted at one end on the lens board and swinging in a plane perpendicular to the plane of the lens board, a second bracket immovably fixed at the end of the first bracket and extending therefrom in two directions, said second bracket carrying pivoting means at each end thereof, the axes of said pivoting means, extended, intersecting the optical centers of the respective two lenses, telescopic arms pivoted together at one end and having their respective other ends supported by said pivoting means, a space pencil carried by said arms at the end at which they are pivoted together, a drawing table supported between said lens board and said space pencil, and stationary relative to said lens board, and a pair of recording styli supported one on each of said telescopic arms and engaging the surface of the drawing table to make records thereon, the recording points of said styli being located on straight lines joining the point of the space pencil to the respective optical centers of said lenses, the axes of said telescopic arms being respectively parallel to the aforesaid straight lines.

21. Stereographic drawing apparatus comprising a lens board, a pair of viewing lenses mounted therein, a bracket pivoted at one end on the lens board and swinging in a plane perpendicular to the plane of the lens board, a second bracket immovably fixed at the end of the first bracket and extending therefrom in two directions, said second bracket carrying pivoting means at each end thereof, the axes of said pivoting means, extended, intersecting the optical centers of the respective two lenses, telescopic arms pivoted together at one end and having their respective other ends supported by said pivoting means, a space pencil carried by said arms at the end at which they are pivoted together, a drawing table supported between said lens board and said space pencil, and stationary relative to said lens board, and a pair of recording styli supported one on each of said telescopic arms and engaging the surface of the drawing table to make records thereon, the recording points of said styli being located on straight lines joining the point of the space pencil to the respective optical centers of said lenses, the axes of said telescopic arms being respectively parallel to the aforesaid straight lines; and the axis of said space pencil being parallel to the aforesaid axes of said pivoting means.

22. Stereographic drawing apparatus comprising a lens board, a pair of viewing lenses mounted therein, a bracket pivoted at one end on the lens board and swinging in a plane perpendicular to the plane of the lens board, a second bracket immovably fixed at the end of the first bracket and extending therefrom in two directions, said second bracket carrying pivoting means at each end thereof, the axes of said pivoting means extended, intersecting the optical centers of the respective two lenses, telescopic arms pivoted together at one end and having their respective other ends supported by said pivoting means, a space pencil carried by said arms at the end at which they are pivoted together, a drawing table supported between said lens board and said space pencil, and stationary relative to said lens board, and a pair of recording styli supported one on each of said telescopic arms and engaging the surface of the drawing table to make records thereon, and means for temporarily lifting said styli from engagement with the drawing table.

23. Stereographic drawing apparatus comprising a drawing table, means establishing a pair of viewing points from which to observe said drawing table, a universally movable space pencil, and means supporting said space pencil comprising a pair of mechanical linkages establishing a pair of imaginary parallelograms, the axis of said space pencil constituting a common short side of both parallelograms, and the aforesaid viewing points constituting corners of the respective parallelograms about which the parallelograms rotate as the space pencil moves, and a pair of recording means engaging said drawing table to make drawings thereon, said recording means being supported from the respective mechanical linkages.

24. Stereographic drawing apparatus comprising a drawing table, means establishing a pair of viewing points from which to observe said drawing board, a universally movable space pencil, and means supporting said space pencil comprising a pair of mechanical linkages establishing a pair of imaginary parallelograms, the axis of said space pencil constituting a common short side of both parallelograms, and the aforesaid viewing points constituting corners of the respective parallelograms about which the parallelograms rotate as the space pencil moves, and a pair of recording means engaging said drawing table to make drawings thereon, said recording means being supported from the respective mechanical linkages in such manner that their points of engagement with the drawing table are at all times respectively on straight lines connecting the two viewing points and the operative point of said space pencil.

25. Stereographic drawing apparatus comprising a drawing table, means establishing a pair of viewing points from which to observe said drawing board, a universally movable space pencil, and means supporting said space pencil comprising a pair of mechanical linkages establishing a pair of imaginary parallelograms, the axis of said space pencil constituting a common short side of both parallelograms, and the aforesaid viewing points constituting corners of the respective parallelograms about which the parallelograms rotate as the space pencil moves, and a pair of recording means engaging said drawing table to make drawings thereon, said recording means being supported from the respective mechanical linkages in such manner that their points of engagement with the drawing table are at all times respectively on straight lines connecting the two viewing points and the operative point of said space pencil, the said mechanical linkages providing for varying the lengths of the long sides of said parallelograms.

JOHN T. RULE.